[19] United States Patent
Naarmann et al.

[11] Patent Number: 4,532,188
[45] Date of Patent: Jul. 30, 1985

[54] ELECTRICALLY CONDUCTIVE PYRROLE COPOLYMER ARTICLE

[75] Inventors: Herbert Naarmann, Wattenheim; Gernot Koehler; Johannes Schlag, both of Ludwigshafen, all of Fed. Rep. of Germany

[73] Assignee: BASF Aktiengesellschaft, Fed. Rep. of Germany

[21] Appl. No.: 504,723

[22] Filed: Jun. 16, 1983

[30] Foreign Application Priority Data

Jun. 24, 1982 [DE] Fed. Rep. of Germany ....... 3223545

[51] Int. Cl.$^3$ ...................... B32B 27/00; C25B 11/00
[52] U.S. Cl. .................................... 428/500; 428/543; 427/86; 427/87; 252/500; 204/290 R
[58] Field of Search .................. 428/500, 543; 427/86, 427/87; 252/500

[56] References Cited

U.S. PATENT DOCUMENTS 3,574,072 4/1971 Louvar ................................. 204/72
3,916,066 10/1975 Youtsey et al. ..................... 428/409

FOREIGN PATENT DOCUMENTS 16305 1/1980 European Pat. Off. .
3049551 7/1982 Fed. Rep. of Germany .

OTHER PUBLICATIONS

D. E. Weiss et al., "Electronic Conduction in Polymers, I. The Chemical Structure of Polypyrrole", Austr. J. Chem., vol. 16, pp. 1056–1075, (1963).
D. E. Weiss et al., "Electronic Conduction in Polymers, II. The Electrochemical Reduction of Polypyrrole at Controlled Potential", Austr. J. Chem., vol. 16, pp. 1076–1089, (1963).
D. E. Weiss et al., "Electronic Conduction in Polymers, III. Electronic Properties of Polypyrrole", Austr. J. Chem., vol. 16, pp. 1096–1103, (1963).
A. F. Diaz et al., "Electrochemical Polymerization of Pyrrole", J. Chem. Soc., Chem. Comm., 1979, pp. 635–636.
A. F. Diaz et al., "'Organic Metals': Polypyrrole a Stable Synthetic 'Metallic' Polymer", J. Chem. Soc., Chem. Comm., 1979, pp. 854–855.
American Chemical Society, "Electrosynthesis and Study of Conducting Polymeric Films", Organic Coatings and Plastics Chemistry, vol. 43, 1980, pp. 774–776.
A. G. McDiarmid and A. J. Heeger, "Organic Metals and Semiconductors: The Chemistry of Polyacetylene, $(CH)_x$, and its Derivatives", Synthetic Metals, Band 1, 1979/1980, pp. 101–118.

Primary Examiner—Patricia C. Ives
Attorney, Agent, or Firm—Keil & Weinkauf

[57] ABSTRACT

Highly electrically conductive copolymers of pyrroles and alkynes and/or aromatics, which possess good mechanical properties coupled with a well-balanced spectrum of properties, are prepared by anodic polymerization of the pyrroles and alkynes and/or aromatics in a polar solvent in the presence of a suitable conductive salt.

4 Claims, No Drawings

ELECTRICALLY CONDUCTIVE PYRROLE COPOLYMER ARTICLE

The present invention relates to electrically conductive copolymers of pyrroles and alkynes and/or aromatics, and the preparation by anodic polymerization of these compounds in the presence of a conductive salt. The novel copolymers thus obtained are materials, in general films, which possess high electrical conductivity, good mechanical properties, high stability and generally advantageous performance characteristics.

U.S. Pat. No. 3,574,072 describes the electrochemical polymerization of 5-membered and 6-membered heterocyclic compounds, including pyrrole, but no details are given concerning the electrical conductivity and the processability of the resulting materials. The stated patent also gives no information about the copolymerization of the heterocyclic compounds or the properties of the copolymers obtained from these.

A. F. Diaz et al., J. Chem. Soc. Chem. Comm. 1979, page 635, J. Chem. Soc. Chem. Comm. 1979, page 854, and ACS Org. Coat. Plast. Chem. 43 (1980), have disclosed that anodic polymerization of pyrrole in the presence of a conductive salt gives films having electrical conductivities of not more than $10^2$ Ohm$^{-1}$ cm$^{-1}$. These are p-conductive polypyrroles, and the counterions are, in particular, $BF_4^-$, $AsF_6^-$, $ClO_4^-$ and $HSO_4^-$. However, the mechanical and electrochemical properties of the films thus obtained are still far from satisfactory. To date, it has not been possible to prepare n-conductive polypyrroles.

According to the copending patent application Ser. No. 332,839, filed Dec. 21, 1981 of the same assignee, now U.S. Pat. No. 4,401,545, anodic polymerization of pyrroles in the presence of, as conductive salts, salts of acidic nitroaromatics gives electrically conductive polypyrrole complexes which contain nitroaromatic anions and possess substantially better mechanical properties than the conventional electrically conductive polypyrroles. However, these polypyrrole complexes which possess nitroaromatic anions are still unsatisfactory for special purposes; in particular, they, too, are only p-conductive, and cannot be converted to n-conductive systems.

Moreover, it has been disclosed that polyene systems, eg. polyacetylene or polyphenylene, can be converted to highly electrically conductive polymers by doping them with electron acceptors or electron donors (cf. for example A. G. McDiarmid and A. J. Heeger, "Synthetic Metals" 1 (1979/80), 101–118, and European Pat. No. A1-16,305). These electrically conductive polymeric systems can be either p-conductors or n-conductors, but, because they are highly sensitive to air and moisture and the polymers are difficult to process, they have the disadvantage of being difficult and expensive to prepare (in particular in the film form preferred in practice) and to handle. As a result of this, their usefulness is also restricted.

It is an object of the present invention to provide further novel highly electrically conductive polymers which possess good mechanical properties and can be readily obtained in the form of films, thus making them easy to handle and to use. In particular, it is an object of the present invention to provide further novel pyrrole polymers which possess the stated properties, and are very easy to use and have a wide range of uses because of their well-balanced spectrum of properties, which is superior to that of the conventional electrically conductive polymeric systems, in particular because of their performance characteristics.

We have found, surprisingly, that this object is achieved by copolymers of pyrroles and alkynes and/or aromatics which are prepared by anodic oxidation in the presence of a conductive salt.

The present invention accordingly relates to electrically conductive copolymers of pyrroles and alkynes and/or aromatics.

An embodiment of the invention relates to copolymers obtained by anodic copolymerization of pyrroles together with alkynes and/or aromatics. Another embodiment of the invention relates to copolymers obtained by anodic polymerization of pyrroles, or of pyrroles and alkynes and/or aromatics, onto an electrically conductive alkyne polymer. A further embodiment of the invention relates to copolymers obtained by anodic polymerization of pyrroles, or of pyrroles and alkynes and/or aromatics, onto an electrically conductive polyaromatic. Yet another embodiment of the invention relates to copolymers obtained by anodic polymerizacion of alkynes and/or aromatics, or of pyrroles and alkynes and/or aromatics, onto an electrically conductive polypyrrole.

The present invention furthermore relates to a process for the preparation of these copolymers in accordance with the detailed description below.

The novel copolymers prepared by anodic polymerization are highly electrically conductive polymeric systems, some or all of which contain the anion of the conductive salt used in their preparation. The copolymers according to the invention may therefore also be regarded as complexes of cations of the copolymers with counteranions. They possess, in addition to high electrical conductivity, good mechanical properties and satisfactory stability to oxygen and moisture. A particular advantage is the fact that these copolymers can be converted to n-conductive systems. We have found that the novel copolymers can be readily produced in the form of self-supporting films, and are easy to handle and to process. Because of these characteristics and their generally well-balanced and improved performance characteristics, they are very easy to use and have a wide range of uses.

In the novel copolymers, the proportion of pyrrole units, and accordingly also the proportion of the units based on alkynes and/or aromatics, can vary within wide limits, depending on the specific type of copolymer, and its intended properties; for example, it can be from 1 to 99% by weight, based on the copolymer. Very suitable copolymers have proved to be those in which the weight ratio of the pyrrole units to the units based on alkynes and/or aromatics is from 20:80 to 90:10.

For the purposes of the present invention, pyrroles are unsubstituted pyrrole itself, substituted pyrroles, such as N-alkylpyrroles, N-arylpyrroles, pyrroles which are monoalkyl-substituted or dialkyl-substituted at the carbon atoms and pyrroles which are monohalogenated or dihalogenated at the carbon atom, as well as dimeric and oligomeric pyrroles. In the preparation of the novel copolymers, the pyrroles can be used alone or mixed with one another, so that the copolymers may contain one or more different pyrroles. Preferably, the repeating pyrrole units in the copolymers are essentially based on unsubstituted pyrrole itself. Where substituted pyrroles are employed in the preparation, preferred compounds are the 3,4-dialkylpyrroles, in particular those where alkyl is of 1 to 4 carbon atoms, eg. 3,4-dimethylpyrrole and 3,4-diethylpyrrole, as well as the 3,4-dihalopyrroles, in particular 3,4-dichloropyrroles.

Suitable alkynes for the preparation of the novel copolymers are acetylene, alkylacetylenes, in particular those where alkyl is of 1 to 12 carbon atoms, arylacetylenes and halogen-substituted acetylenes, as well as dialkynes, polyalkynes and alkenylalkynes. Examples of alkylacetylenes are propyne, butyne, pentyne, hexyne, heptyne, octyne and decyne. A typical example of an arylacetylene is phenylacetylene. Examples of dialkynes and polyalkynes include the butadiyne, hexadiyne, octadiyne, diethynylbenzene and triethynylbenzene, but 1,6-heptadiyne is one of the preferred compounds from this group. Acetylene itself has proved to be a particularly advantageous alkyne; accordingly, polyacetylene is also the preferred polyalkyne.

Suitable aromatics for the preparation of the novel copolymers are both benzoid and non-benzoid aromatic hydrocarbons, and pseudoaromatic compounds. The benzoid aromatics which can be used according to the invention are, in particular, polynuclear aromatic ring systems which possess 6 carbon atoms per ring and in which the aromatic rings can be either bonded to one another in a linear manner or fused together.

Examples of aromatic ring systems of this type which are linked together in a linear manner are the oligophenylenes, in particular those containing from 2 to 6 phenyl or phenylene radicals, eg. diphenyl, terphenyl, quarterphenyl, quinquiphenyl and sexiphenyl. From this series, terphenyl has proved very advantageous. Examples of fused aromatic ring systems are anthracene, phenanthrene, tetracene, acenaphthene and phenalene. Preferred polyaromatics are the polyphenylenes. Suitable non-benzoid aromatic hydrocarbons and pseudoaromatic hydrocarbons are compounds such as cyclooctatetraene and heptalene, and in particular compounds containing 5-membered rings. These include, in particular, cyclopentadiene and its derivatives, such as substituted cyclopentadienes, eg. 2-chlorocyclopentadiene and 2-bromocyclopentadiene; fulvenes, eg. dimethylfulvene and phenylfulvene; azulenes, eg. unsubstituted azulene, benzazulene, trimethylazulene and gujaazulene; pentalene and in particular unsubstituted and substituted indene.

To prepare the novel copolymers, the monomers, ie. the pyrroles, alkynes and/or aromatics, are anodically oxidized and hence polymerized in a polar solvent in the presence of a suitable conductive salt. The monomer concentration in the electrolyte solvent is in general about 0.1 mole per liter of solvent. However, it can deviate substantially from this value since the electrolysis is generally carried out only to small conversions.

Preferably used conductive salts are ionic or ionizable compounds possessing anions of strong, oxidizing acids or aromatics which have acidic groups and are unsubstituted or substituted by nitro groups. Suitable cations for these conductive salts are alkaline earth metal cations, $H^+$ and in particular alkali metal cations, preferably $Li^+$, $Na^+$ or $K^+$. Other very advantageous cations are $NO^+$, $NO_2^+$ and in particular the onium cations, especially those of nitrogen and of phosphorus, for example those of the $R_4N^+$ or $R_4P^+$ type, wherein the radicals R independently of one another are each hydrogen, lower alkyl, preferably of 1 to 6 carbon atoms, a cycloaliphatic radical, preferably of 6 to 14 carbon atoms, or an aromatic radical, preferably of 6 to 14 carbon atoms. Particularly preferred ammonium and phosphonium cations are the tertiary and quaternary cations in which alkyl is of 1 to 4 carbon atoms. Examples of preferred onium cations are, in addition to the $NH_4^+$ ion, in particular the tetramethylammonium, the tetraethylammonium, the tetra-n-butylammonium, the triphenylphosphonium and the tri-n-butylphosphonium cation.

$BF_4^-$, $AsF_4^-$, $AsF_6^-$, $SbF_6^-$, $SbCl_6^-$, $PF_6^-$, $ClO_4^-$, $HSO_4^-$, $SO_4^{2-}$ and $CH_3SO_4^-$ have proved to be particularly advantageous as anions for the conductive salt. Another group of anions which is suitable for these salts and can be particularly advantageously employed in the preparation of the novel copolymers is derived from aromatics possessing acidic groups. These include the $C_6H_5COO^-$ anion and in particular the anions of unsubstituted or alkyl-substituted aromatic sulfonic acids. In another very advantageous embodiment, the nuclei of the acidic aromatics can carry, in addition to the acidic groups, other substituents, in particular nitro groups. Examples of these acidic nitroaromatics are nitrophenols, nitro-substituted aromatic carboxylic acids and nitro-substituted aromatic sulfonic acids. In particular, the salts of nitrophenols, dinitrophenols, trinitrophenols, nitrobenzoic acids, dinitrobenzoic acids, trinitrobenzoic acids, nitrobenzenesulfonic acids, dinitrobenzenesulfonic acids and trinitrobenzenesulfonic acids are used, and the salts of nitroaromatics possessing several acidic groups, eg. phenolic hydroxyl groups, car-boxyl groups or sulfonic acid groups, are also suitable. Other suitable compounds are acidic aromatics possessing nitroso groups. Conductive salts containing the benzenesulfonate anion ($C_6H_5SO_3^-$) give good results and are hence very particularly preferred. In the novel process, the conductive salt concentration is in general from 0.001 to 1, preferably from 0.01 to 0.1 mole/liter of electrolyte solvent.

The process according to the invention is carried out in a polar, preferably organic, in particular aprotic, solvent which is capable of dissolving the monomers and the conductive salt. If a water-miscible organic solvent is used, the electrical conductivity may be increased by adding a small amount of water, in general not more than 3% by weight, based on the organic solvent, and this may be done even if as a rule the procedure is carried out in an anhydrous system. Examples of preferred organic electrolyte solvents are alcohols, ethers, such as 1,2-dimethoxyethane, dioxane, tetrahydrofuran and methyltetrahydrofuran, acetone, acetonitrile, dimethylformamide, dimethylsulfoxide, methylene chloride, N-methylpyrrolidone and propylene carbonate.

The preparation of the novel copolymer is preferably carried out in a simple conventional electrolysis cell or electrolysis apparatus which consists of a cell without a diaphragm, possesses two electrodes and is connected to an external current source. The electrodes can be of, for example, graphite, but in general nickel, titanium or noble metal electrodes, preferably platinum electrodes, are used. It is advantageous if the anode has a sheet-like structure, and particularly advantageous if both electrodes have such a structure. In a particular embodiment of the novel process, the anode may furthermore be composed of an electrically conductive polymer, for example polypyrrole prepared by anodic oxidation, doped p-conductive polyacetylene or doped p-conductive polyphenylene. In this case, the pyrroles and alkynes and/or aromatics are polymerized onto the electrically conductive polymer anode, which is generally in the form of a film.

Depending on the manner in which the process is carried out, different types of copolymers can result. If, for example, noble metal electrodes and a mixture of pyrroles and alkynes and/or aromatics are employed, the resulting polymer film contains the monomer units in random distribution. However, the monomers, ie. the pyrroles and alkynes and/or aromatics, can also be polymerized stepwise, ie. in succession. For example, it is possible first to polymerize only the pyrrole, with deposition of an appropriate polypyrrole film on the anode, and thereafter to anodically oxidize the alkynes and/or the aromatics and thereby polymerize these onto the polypyrrole produced beforehand. An equally suitable method of carrying out this version of the process is to employ a prepared polypyrrole film as the anode and then to polymerize the alkynes and/or the aromatics onto this anode. This gives copolymers or copolymer films which have a layered structure and high electrical conductivity. This stepwise copolymerization can of course also be carried out so that the alkynes and/or the aromatics are polymerized first, followed by the pyrroles, or that more than two stages are employed, in which, for example, first the pyrroles, then the alkynes and/or aromatics and finally once again the pyrroles are polymerized.

Even when the stated electrically conductive polymers are employed as the anode material, the pyrroles and alkynes and/or aromatics can be polymerized either as a mixture or stepwise, ie. in succession. For example, when the anode material used is doped polyacetylene and a mixture of pyrroles and alkynes is employed, the resulting copolymer film is highly electrically conductive and comprises a layer composed of acetylene units and, linked to this via chemical bonds, a layer composed of pyrrole and alkyne units. If the copolymerization of the pyrroles and alkynes is carried out by a stepwise procedure, the resulting copolymer film comprises a layer composed of acetylene units, a layer composed of pyrrole units and a layer composed of units of the other alkynes, the individual layers being linked with one another via chemical bonds. The same applies where electrically conductive polyphenylene is used as the anode material and pyrroles and aromatics are used as monomers. In a particularly interesting version of the process, for example, an electrically conductive polypyrrole is used as the anode material and polymerization is carried out in a stepwise procedure in which alkynes and/or aromatics, in particular acetylene, are polymerized, followed by a pyrrole. This procedure gives a highly electrically conductive copolymer film in which the two outer layers consist of pyrrole units and the middle layer is composed of units of the alkynes and/or the aromatics, in particular acetylene. Such films, in addition to possessing other outstanding properties, are unusually stable to air and moisture. Other advantageous copolymer films are those in which a mixture of pyrroles and alkynes and/or aromatics has been polymerized onto a polypyrrole film serving as the anode.

If the anode already consists of electrically conductive polymers, it is of course sufficient in the preparation of the novel copolymer by the process according to the invention if only the other monomers required are employed. If the anode is, for example, electrically conductive polyacetylene or electrically conductive polyphenylene, the novel copolymer can also be prepared by polymerizing the pyrrole alone onto this anode material. On the other hand, if the anode is a polypyrrole film, the only monomers required in the novel process are the alkynes and/or the aromatics.

In addition to the above simple electrolysis cell without a diaphragm, it is also possible to use other electrolysis apparatuses for the novel process, for example cells containing a diaphragm or those possessing reference electrodes for the precise determination of the potential. To monitor the thickness of the deposited film, it is advantageous to measure the amount of current (amp.-sec).

The electrolysis is usually carried out at room temperature and under an inert gas. The temperature at which the copolymerization of the pyrroles and alkynes and/or aromatics is carried out was found not to be critical, so that it can be varied within a substantial range provided that it does not fall below the solidification point, or exceed the boiling point, of the electrolyte solvent. In general, a reaction temperature of from $-40$ to $+40°$ C. has proved very advantageous.

A suitable current source for operating the electrolysis cell in which the novel process is carried out is any d.c. current cell, eg. a battery which delivers a sufficiently high voltage. Advantageously, the voltage is from about 1 to 25, particularly advantageously from about 2 to 12, volts. The current density is usually from 0.05 to 100, preferably from 0.1 to 20, mA/cm$^2$.

The novel copolymers deposited at the anode during electrolysis are washed with solvents to remove adhering conductive salt, and dried at from 30° to 150° C., preferably under reduced pressure. When graphite, noble metal or similar electrodes are used, the copolymer, which is generally deposited as a film, can be readily detached from the electrode, especially where the thickness of the deposited layer is greater than 50 $\mu$m. Where the anode material used is a conductive polymer film, the comonomers employed according to the invention are, as mentioned above, polymerized onto the polymeric electrode material, so that in this case the polymer used as the anode is incorporated in the resulting copolymer.

The novel copolymers have high electrical conductivities, in general from 1 to $10^2$ Ohm$^{-1}$cm$^{-1}$, and good mechanical properties. To measure the force at break and the tensile strength, films composed of the novel copolymers and having defined dimensions (clamped length 25 mm, measured length 10 mm, width 4 mm) are stretched in accordance with DIN 53,504 on an INSTRON 1112 machine until they break. During this process, the films are not significantly elongated. The electrical conductivity (in Ohms$^{-1}$cm$^{-1}$) is determined by applying conductive silver contacts to the film and carrying out the measurement by the two-point method. Substantially the same results are obtained when the measurement is carried out by the four-point method, where the contact resistances cannot play a role. The anodic polymerization according to the invention gives p-conductive copolymers. These can be discharged electrochemically and then converted to n-conductive systems using conventional electron donors as dopants, the simplest method of carrying out this conversion likewise being an electrochemical one.

The novel copolymers have very good performance characteristics and can be used for the production of electrodes, catalysts, electrical storage systems, batteries, switches, semiconductor components, shielding materials and solar cells, and for the antistatic treatment of plastics. They constitute an advance in the art especially where good mechanical properties of the components, coupled with low specific gravity and well-balanced properties, are important.

In the Examples which follow, and illustrate the invention, parts and percentages are by weight, unless stated otherwise.

EXAMPLE 1

120 ml of acetonitrile, 0.48 g of pyrrole and 0.39 g of tributylammonium m-nitrobenzenesulfonate were initially taken in a glass vessel, two platinum electrodes, each having an area of 14 cm$^2$ were introduced into the solution at a distance of 4 cm apart, and electrolysis was carried out using a current of 140 amp.sec, while stirring. During electrolysis, a black polypyrrole film was deposited on the anode. 0.5 g of terphenyl was then introduced into the electrolyte, and was polymerized anodically onto the polypyrrole film, under the above conditions. The coated anode was washed with acetonitrile and dried at 60° C., after which the copolymer film formed could be detached from the platinum. The 78 μm thick film had a tensile strength of 51 N/mm$^2$ and an electrical conductivity of 80 Ohm$^{-1}$cm$^{-1}$.

A similar polymer was obtained in a shorter time when the terphenyl was replaced by terphenyl m-nitrobenzenesulfonate, the procedure being otherwise identical.

EXAMPLE 2

Electrolysis was carried out in the apparatus described in Example 1 and under the conditions stated in that Example, except that in this case 0.5 g of pyrrole, 0.2 g of terphenyl and, as the conductive salt, 0.6 g of tributylammonium perchlorate were initially taken, and the monomer mixture was copolymerized. The resulting 58 μm thick film had a tensile strength of 60 N/mm$^2$ and an electrical conductivity of 43 Ohm$^{-1}$cm$^{-1}$.

EXAMPLE 3

120 ml of acetonitrile, 0.48 g of pyrrole and, as the conductive salt, 1.4 g of 2-nitrophenol and 1.85 g of tributylamine were initially taken in an electrolysis vessel as described in Example 1, and the mixture was stirred. Electrolysis was carried out using a current of 140 amp.sec, while 0.6 g of acetylene was metered in at the same time. The resulting 60 μm thick copolymer film had a tensile strength of 41 N/mm$^2$ and an electrical conductivity of 21 Ohm$^{-1}$cm$^{-1}$.

EXAMPLE 4

120 ml of acetonitrile, 0.48 g of pyrrole, 0.2 g of phenalene, 1.5 g of tributylammonium sulfate, 0.2 g of 1,6-heptadiyne and 0.93 g of tributylamine were stirred in an electrolysis apparatus as described in Example 1, and electrolysis was carried out using a current of 140 amp.sec. The resulting 57 μm thick copolymer film had a tensile strength of 35 N/mm$^2$ and an electrical conductivity of 33 Ohm$^{-1}$cm$^{-1}$.

EXAMPLE 5

120 ml of acetonitrile, 0.5 g of tetracene, 0.56 g of N-methylpyrrole and 0.39 g of tributylammonium perchlorate were initially taken, under argon, in an electrolysis apparatus as described in Example 1, and the mixture was stirred. The anode used was a polypyrrole film, and electrolysis was carried out using a current of 80 amp.sec. The resulting 60 μm thick film had a tensile strength of 19 N/mm$^2$ and an electrical conductivity of 16 Ohm$^{-1}$cm$^1$.

EXAMPLE 6

120 ml of acetonitrile, 0.61 g of 3,4-dimethylpyrrole and 0.45 g of tributylammonium hexafluorophosphate were initially taken, under argon, in an electrolysis apparatus as described in Example 1, and the mixture was stirred. The anode used was a p-conductive polyacetylene film doped with 10% of PF$_6^-$, and electrolysis was carried out using a current of 140 amp.sec. The resulting 65 μm thick film had a tensile strength of 20 N/mm$^2$ and an electrical conductivity of 14 Ohm$^{-1}$cm$^{-1}$.

EXAMPLE 7

120 ml of acetonitrile, 0.84 ml of water, 0.48 g of pyrrole and 0.8 g of tetramethylammonium tetrafluoroborate were initially taken in an electrolysis apparatus as described in Example 1, and the mixture was stirred. The anode used in this case was a p-conductive polyacetylene film doped with 15% of BF$_4^-$, and electrolysis was carried out using a current of 100 amp.sec. The resulting 55 μm thick co-polymer film had a tensile strength of 30 N/mm$^2$ and an electrical conductivity of 15 Ohm$^{-1}$cm$^{-1}$.

EXAMPLE 8

The procedure was carried out as described in Example 7, except that in this case the anode employed was a p-conductive polyphenylene doped with 23% of AsF$_6^-$. After the pyrrole had been polymerized onto the polyphenylene, the conductivity of the film was 150 Ohm$^{-1}$cm$^{-1}$.

EXAMPLE 9

120 ml of acetonitrile, 0.84 ml of water, 0.48 g of pyrrole, 0.5 g of tetracene, 0.3 g of phenylacetylene and 1.18 g of concentrated sulfuric acid were initially taken in an electrolysis apparatus as described in Example 1, and the mixture was stirred. Electrolysis was carried out using a current of 100 amp.sec. The resulting 20 μm thick film had a tensile strength of 15 N/mm$^2$ and an electrical conductivity of 7 Ohm$^{-1}$cm$^{-1}$.

EXAMPLE 10

120 ml of acetonitrile, 0.84 ml of water, 0.48 g of pyrrole, role, 0.5 g of acenaphthene, 0.5 g of 1,6-heptadiyne and 1.15 g of K(AsF$_6$) were initially taken in an electrolysis vessel as described in Example 1, and the mixture was stirred. Electrolysis was carried out using a current of 100 amp.sec. The resulting 32 μm thick copolymer film had a tensile strength of 18 N/mm$^2$ and an electrical conductivity of 50 Ohm$^{-1}$cm$^{-1}$.

EXAMPLE 11

120 ml of acetonitrile, 0.48 g of pyrrole, 0.5 g of azulene and 0.39 g of tributylammonium m-nitrobenzenesulfonate were initially taken in a glass vessel, two platinum electrodes, each having an area of 14 cm$^2$, were introduced into the solution at a distance of 4 cm apart, and electrolysis was carried out using a current of 140 amp.sec., while stirring. During electrolysis, a black, smooth film was deposited on the anode. The coated anode was washed with acetonitrile and dried at 60° C. under a pressure of 10 mm Hg for 5 hours, after which the copolymer film formed could be detached from the platinum. The 40 μm thick film had a tensile strength of 15 N/mm$^2$ and an electrical conductivity of 45 Ohm$^{-1}$cm$^{-1}$.

A similar polymer was obtained when 0.4 g of potassium naphthalenedisulfonate was used as the conductive salt, the procedure being otherwise identical.

EXAMPLE 12

Electrolysis was carried out in an apparatus as described in Example 11 and under the conditions stated in that Example, except that in this case 0.5 g of pyrrole, 0.8 g of indene and, as the conductive salt, 0.6 g of trithylammonium perchlorate were initially taken and the monomer mixture was copolymerized. The resulting 42 μm thick film had a tensile strength of 40 N/mm$^2$ and an electrical conductivity of 41 Ohm$^{-1}$cm$^{-1}$.

EXAMPLE 13

120 ml of acetonitrile, 0.48 g of pyrrole and, as the conductive salt, 1.4 g of trinitrophenol and 1.85 g of tributylamine were initially taken in an electrolysis vessel as described in Example 11, and the mixture was stirred. Electrolysis was carried out using a current of 140 amp.sec. while 0.52 g of indene was metered in at the same time. The resulting 44 μm thick copolymer film had a tensile strength of 39 N/mm$^2$ and an electrical conductivity of 62 Ohm$^{-1}$cm$^{-1}$.

EXAMPLE 14

120 ml of acetonitrile, 0.48 g of pyrrole, 0.2 g of indene, 0.3 g of cyclopentadiene, 1.5 g of benzenesulfonic acid and 0.93 g of tributylamine were stirred in an electrolysis apparatus as described in Example 11, and electrolysis was carried out using a current of 140 amp.sec. The resulting 45 μm thick copolymer film had a tensile strength of 40 N/mm$^2$ and an electrical conductivity of 64 Ohm$^{-1}$cm$^{-1}$.

EXAMPLE 15

120 ml of acetonitrile, 0.61 g of 3,4-dimethylpyrrole, 0.39 g of indene and 0.45 g of tributylammonium hexafluorophosphate were initially taken in an electrolysis apparatus as described in Example 11, and the mixture was stirred. The anode used was a p-conductive polyacetylene film doped with 10% of PF$_6^-$, and electrolysis was carried out using a current of 150 amp.sec. The resulting 50 μm thick film had a tensile strength of 35 N/mm$^2$ and an electrical conductivity of 35 Ohm$^{-1}$cm$^{-1}$.

EXAMPLE 16

120 ml of acetonitrile, 0.84 ml of water, 0.48 g of pyrrole, 0.8 g of azulene, 0.2 g of indene and 1.0 g of tetramethylammonium tetrafluoroborate were initially taken in an electrolysis apparatus as described in Example 11, and the mixture was stirred. The anode used in this case was a p-conductive polyacetylene film doped with 15% of SO$_4^{2-}$, and electrolysis was carried out using a current of 100 amp.sec. The resulting 50 μm thick copolymer film had a tensile strength of 60 N/mm$^2$ and an electrical conductivity of 45 Ohm$^{-1}$cm$^{-1}$.

EXAMPLE 17

Electrolysis was carried out as described in Example 16, except that in this case the anode used was a p-conductive polyphenylene doped with 23% of AsF$_6^-$. After the mixture of pyrrole, azulene and indene had been polymerized onto the polyphenylene, the conductivity of the film was 15 Ohm$^{-1}$cm$^{-1}$.

EXAMPLE 18

120 ml of dioxane, 0.84 ml of water, 0.48 g of pyrrole, 0.5 g of indene, 0.3 g of cyclopentadiene and 1.18 g of concentrated sulfuric acid were initially taken in an electrolysis apparatus as described in Example 11, and the mixture was stirred. Electrolysis was carried out using a current of 100 amp.sec. The resulting 30 μm thick film had a tensile strength of 30 N/mm$^2$ and an electrical conductivity of 10 Ohm$^{-1}$cm$^{-1}$.

EXAMPLE 19

120 ml of acetonitrile, 0.84 ml of water, 0.48 g of pyrrole, 0.5 g of indene, 0.5 g of azulene and 1.15 g of K(AsF$_6$) were initially taken in an electrolysis vessel as described in Example 11, and the mixture was stirred. Electrolysis was carried out using a current of 100 amp.sec. The resulting 40 μm thick copolymer film had a tensile strength of 28 N/mm$^2$ and an electrical conductivity of 10 Ohm$^{-1}$cm$^{-1}$.

We claim:

1. An electrically conductive copolymer which comprises: one or more layers of a polypyrrole or a copolymer of pyrroles and alkynes and/or aromatics, and, chemically bonded to this, one or more layers consisting of an electrically conductive polyalkyne.

2. A copolymer as set forth in claim 1, which comprises one or more layers of a polypyrrole or a copolymer of pyrroles and alkynes and/or aromatics, and, chemically bonded to this, one or more layers consisting of an electrically conductive polyaromatic.

3. A copolymer as set forth in claim 1, which comprises one or more layers of a polymer of alkynes and aromatics and, chemically bonded to this, one or more layers consisting of a polypyrrole.

4. A copolymer as set forth in claim 1, which comprises one or more layers of a copolymer of pyrroles and alkynes and/or aromatics and, chemically bonded to this, one or more layers of a polypyrrole.

* * * * *